Aug. 22, 1944.　　　R. G. CHOLLAR　　　2,356,380
METHOD OF MOLD MANUFACTURE
Filed Aug. 28, 1941

Robert G. Chollar
Inventor
By Carl Beust
His Attorney

Patented Aug. 22, 1944

2,356,380

UNITED STATES PATENT OFFICE 2,356,380

METHOD OF MOLD MANUFACTURE

Robert G. Chollar, Dayton, Ohio, assignor to The National Cash Register Company, Dayton, Ohio, a corporation of Maryland Application August 28, 1941, Serial No. 408,569

2 Claims. (Cl. 18—47.5)

This invention relates to an efficient and inexpensive method of duplicating or reproducing relatively small parts, such as type wheels for business machines, by a novel molding process.

One object of the present invention is to provide a method of reproducing or duplicating relatively small parts.

Another object is the provision of a method for making an efficient and inexpensive mold for reproducing or duplicating relatively small parts.

Still another object is to provide efficient and economical means to mold type wheels and other similar parts out of plastic material.

A further object is to provide a method for reproducing or duplicating relatively small parts, where a sample part is available, by producing a mold of thermo-setting material, using the sample part as a pattern, dissolving the sample part to clear the cavity of the mold, and then using the mold thus formed to mold similar parts out of plastic material.

A still further object is to provide an efficient and inexpensive method of making a mold for reproducing or duplicating relatively small parts, where a sample of such parts is available, by molding a thermo-setting material around the sample part, leaving one face thereof exposed, and then immersing the mold thus formed and the sample part in a chemical solution, which attacks said sample part but does not attack the thermo-setting material, until said sample is dissolved, thus leaving the mold intact.

With these and incidental objects in view, the invention includes certain novel features, the essential elements of which are set forth in appended claims and a preferred form or embodiment of which is hereinafter described with reference to the drawing which accompanies and forms a part of this specification.

Description

Quite often it is desirable and/or necessary to reproduce relatively small parts out of material which is substantially different from the type of material of which the parts were originally made. The present invention is directed to an efficient and economical method for accomplishing this result.

This method or process includes the making of a molding die out of thermo-setting plastic material, using one of the original parts as a pattern, removing the pattern from the finished mold by a dissolution process, and then using the plastic mold for reproducing parts, similar to the pattern, out of a plastic material such as synthetic rubber or the like.

Figure 1:
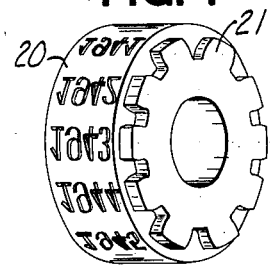
Fig. 1 is an enlarged perspective view of a sample part which is to be reproduced or duplicated.

Fig. 1 shows an original part which is to be used as a pattern, such part in this particular case being a type wheel 20 having integral therewith a gear wheel 21, both of said parts in their original state being made out of some die casting alloy such as "Zamac."

Figure 2:
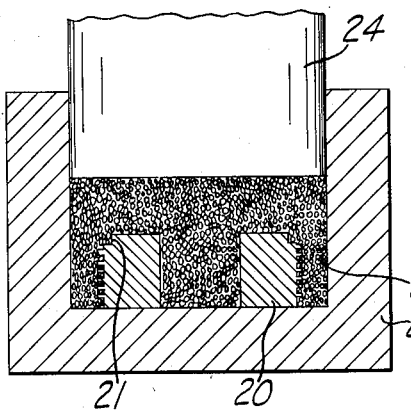
Fig. 2 illustrates the manner in which the thermo-setting material is molded around the sample part by applying heat and pressure.
Figure 3:
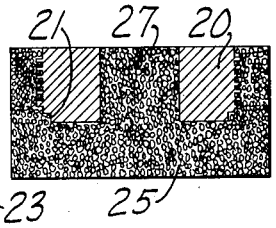
Fig. 3 is a cross-sectional view of the plastic mold with the sample part molded therein.

The original part 20, which is to be used as a pattern for constructing the mold, is placed in the cavity of a metal molding die 22 (Fig. 2) with the gear wheel 21 facing upwardly. With the pattern 20 (Figs. 1 and 2) centrally located in the cavity of the die 22, the proper amount of molding material or compound 23, such as Bakelite in a powdered form, is placed in said cavity around said pattern, after which a plunger 24, which snugly fits the cavity of the die 22, is brought into contact with the molding compound, and the proper amount of pressure and heat is then applied to properly cure said molding compound. After the molding compound has been properly cured, the plastic mold 25 (Figs. 3, 4 and 5) thus formed, together with the pattern 20, which is molded integral therewith, is removed from the cavity of the die 22. It will be noted that one face of the metal pattern 20 remains exposed.

Figure 4:
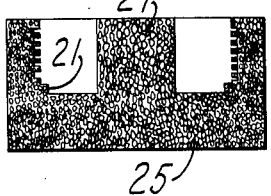
Fig. 4 is another cross-sectional view of the plastic mold after the sample part has been dissolved.
Figure 5:
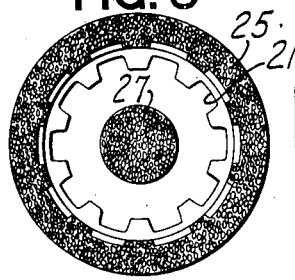
Fig. 5 is a sectional plan view of the plastic mold taken along line 5—5 (Fig. 4), showing the cavity formed therein when the sample part is dissolved.

The next step in the process is to remove the metal pattern 20 from the plastic mold 25, and this is accomplished by submerging the parts in a suitable solution, such as hydrochloric or nitric acid of any dilution and allowing said parts to remain in said acid until the metal pattern 20, including the gear 21, is completely dissolved, thus leaving the cavity of the plastic mold 25 perfectly clean, as shown in Figs. 4 and 5.

Figure 6:
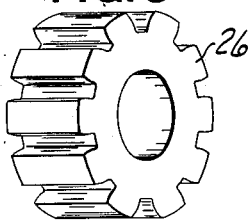
Fig. 6 is an enlarged perspective view of a gear insert which is to be molded in the reproduced parts.

Next, a gear insert (Fig. 6), which is made preferably of die casting material and around which the type portion of the reproduced wheel is to be molded, is placed in the plastic mold 25 (Fig. 5), a boring in said wheel fitting snugly over a molded tenon 27 in said mold, the gear teeth in the bottom of said mold, in cooperation with the teeth of the gear 26, serving to locate said gear in relation to the data which is to be molded on the face of the type wheel. In this particular case, the gear wheel 26 has ten teeth, and it will be noted, by referring to Figs. 5 and 8, that there are ten sets of printing type on the face of the type wheel, located diametrically opposite said ten teeth. Thus the teeth on the metal gear 26 serve as a backing support for the corresponding data on the type wheel when an impression is made.

Figure 7:
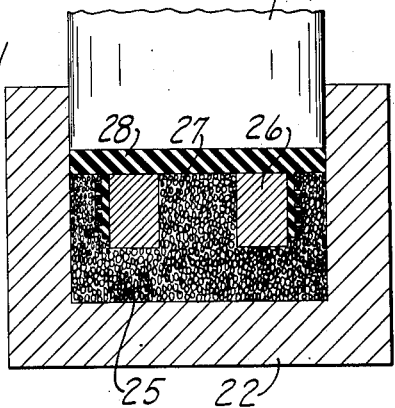
Fig. 7 is a sectional view illustrating the manner in which the plastic mold is used to reproduce parts similar to the pattern shown in Fig. 1.

After the gear 26 has been properly located in the mold 25, said mold is again placed in the cavity of the die 22, as shown in Fig. 7, and the proper amount of molding material for molding the type wheel is then placed in said cavity, said molding material, in this case, being a synthetic rubber, such as "Ameripol," which may be in the form of washers stamped from flat sheet stock or in the form of powdered stock, whichever is preferable. After the proper amount of molding material has been placed in the cavity of the die 22, the plunger 24 is lowered into place, as shown in Fig. 7, and the proper amount of pressure and heat is applied to cause the molding material to flow around the gear 26 and into all the type recesses in the mold 25.

After the molding material has been properly cured, the plunger 24 is removed from the die 22, and the plastic mold 25, together with the molded type wheel, is removed from the cavity of said die 22. It will be noted that a surplus amount of molding material in the form of a flange 28 is provided at the top of the molded article, said flange being used in this case to assist in removing said molded article from the plastic mold 25. In this case, as the type portion of the type wheel is molded of synthetic rubber, the finished article is easily removed from the cavity of said mold 25 by pulling on the flange 28, and particularly is this true if the cavity of said mold 25 has been lubricated with graphite, or some other suitable lubricant commonly used for this purpose, prior to the molding operation.

Figure 8:
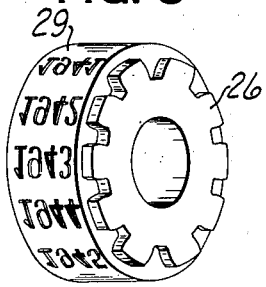
Fig. 8 is a perspective view of one of the reproduced parts which is formed in the manner illustrated in Fig. 7.

After the molded article has been removed from the plastic mold 25, the flange 28 is trimmed from the face thereof, and the finished type wheel 29, shown in Fig. 8, with the metal gear wheel 26 protruding from one face thereof and used for driving said type wheel, is the ultimate result of the molding process.

It has been found through practice that the molding material adheres to the gear wheel 26 with sufficient tenacity for all practical purposes. However, in some cases it may be desirable to use a suitable type of cement on the surface of the gear wheel 26 to insure a better bond between said gear wheel and said molding material.

In some cases it may be advantageous or necessary to split the plastic mold 25 into sections so that articles molded therein may be readily removed. However, in the case of the type wheel 29 (Fig. 8), which, as previously explained, is made of synthetic rubber, it was found unnecessary to split the mold, as the finished type wheels were easily removed therefrom without in the least injuring the characters molded on the face thereof.

In carrying out the process outlined above, it was found that the plastic mold 25 was satisfactory in every respect, as the characters were unusually well formed therein and the dissolving of the metal pattern 20 did not in any way injure said characters. Moreover, it was found that type wheels produced in the manner outlined above were satisfactory in every respect.

Obviously the process outlined above need not be confined to the production of type wheels or to the use of synthetic rubber as a molding compound for the articles produced, as it is evident that many different articles may be produced in the manner outlined above, and many suitable molding materials may be substituted for synthetic rubber.

While the form of the invention herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. The method of making a one-piece mold for reproducing parts originally made of metal in a plastic material, comprising the steps of molding thermo-setting material around one of the original metal parts; and then dissolving the original part with a suitable solvent to provide a mold of thermo-setting material for use in reproducing said parts in plastic material.

2. The method of making an efficient and inexpensive one-piece mold for reproducing parts originally made of metal in a plastic material, comprising the steps of molding thermo-setting material, around one of the original metal parts, using the required amount of heat and pressure to insure the proper flowing and curing of said thermo-setting material; and then dissolving the original part in an acid solution, to produce a one-piece mold for use in reproducing said parts in flexible material.

ROBERT G. CHOLLAR.